United States Patent [19]

Lichti

[11] 4,071,130
[45] Jan. 31, 1978

[54] ARRANGEMENT FOR RECORDING CHARACTERS COMPOSED OF MATRIX-LIKE RASTERED CHARACTER ELEMENTS

[75] Inventor: Reiner Lichti, Unterpfaffenhofen, Germany

[73] Assignee: Siemens Aktiengesellschaft, Berlin & Munich, Germany

[21] Appl. No.: 757,656

[22] Filed: Jan. 7, 1977

[30] Foreign Application Priority Data

Jan. 29, 1976  Germany ............................. 2603347

[51] Int. Cl.² ............................................. B41J 3/04
[52] U.S. Cl. ................................ 197/1 R; 101/93.05; 178/30

[58] Field of Search ..................... 197/1 R; 101/93.04, 101/93.05; 178/30; 340/324 AD

[56] References Cited

U.S. PATENT DOCUMENTS

| 3,330,208 | 7/1967 | Eckel | 101/93.04 |
| 3,934,695 | 1/1976 | Kovalick | 197/1 R |

Primary Examiner—Ralph T. Rader
Attorney, Agent, or Firm—Hill, Gross, Simpson, Van Santen, Steadman, Chiara & Simpson

[57] ABSTRACT

An arrangement for recording characters composed of matrix-like rastered character elements by means of a matrix printer to provide varying configurations to the recorded characters, by electrically varying the relationship of the respective character elements with respect to time.

5 Claims, 4 Drawing Figures

ARRANGEMENT FOR RECORDING CHARACTERS COMPOSED OF MATRIX-LIKE RASTERED CHARACTER ELEMENTS

BACKGROUND OF THE INVENTION

The invention relates to an arrangement for recording characters composed of matrix-like rastered character elements, utilizing a character generator in which the character elements are derived as binary signals in column- and row-like manner which are operable to actuate a plurality of recording elements arranged in a row extending transversely to the direction of the recorded line involved, whereby the respective recording elements effect a recording of respective character elements by means of binary signals supplied by the character generator in a column formation one after the other.

It is often desirable in the recordation of printed or other characters to contrast or emphasize certain characters or portions of text from the remaining characters. This can be accomplished, for example, by utilizing a different ink color, or by changing the configuration of the characters, for example, in normal printing, by italicizing the characters.

In mosaic recordation, this can be achieved by effecting a recordation of the respective characters with a slanting of the normally vertical portions of the characters. From a practical standpoint, this can be achieved by a mechanical inclining of the mosaic recording head, or by utilizing two character generators, either of which may be selectively employed. There are also known arrangements for varying the printing style in electronically controlled mosaic printers, in which pulse delay elements are inserted between the character matrix and the elements producing the recording or printing operation. Such pulse delay elements may be utilized in the form of shift registers exhibiting row-by-row ascending step numbers. If the respective control bits for the mosaic printing unit are supplied by the character generator over such shift registers a slanted position of the characters will result. To provide a normal vertical font, the information flow is bypassed around such shift registers. Known arrangements of this type permit, with a reasonable expense outlay, the choice between a normal font and a single slanted font.

The present invention has as a principal object, the production of an arrangement for recording characters from matrix-like rastered character elements which, by means of inexpensive electronic components, will enable the production of character fonts with different variations in the character configurations.

BRIEF SUMMARY OF THE INVENTION

An arrangement, in accordance with the invention, of the desired results may be achieved by the disposition of a storage stage between the character generator and the amplifier stage supplying the mosaic writing units, whereby the character bits are supplied serially from the character generator under the control of an interrogation logic and ultimately supplied over the storage stage and amplifier stage to the mosaic writing unit. In accordance with an arrangement of this type, merely a single stage storage unit per recording row is required between the character generator and the mosaic writing unit, with the storage unit being operable to temporarily store the respective selection bit for ultimate transfer to the mosaic writing unit. The storage units of the individual write channels are supplied with the respective selection bit from the character generator under the control of an interrogation logic, and by employing an electronic selection logic operating at a much greater speed than the mosaic writing unit, it is possible to interrogate the character generator bit-by-bit, rather than column-by-column, as commonly employed for normal character configuration. By appropriate selection of the individual storage locations of the respective character elements of the character, it is possible to freely select the character configuration.

In accordance with a preferred embodiment of the invention, the interrogation logic is constructed in the form of a pulse-controllable flipflop and a pulse generator unit, which actuates the elements of the storage stage serially and selectively in dependence upon the operation of pulse generator to activate a device for controlling the flow of the impulses of the respective columns for supply to the storage stage.

Advantageously, the pulse generator unit may comprise a pulse generator supplying a pulse counter, from which the output values thereof are supplied to a binary coding device, adapted to supply successive transfer pulses to the respective flipflops of the storage stages. At the same time the output values of the pulse counter may be supplied to an adding device which is adapted to be interposed between the column decoder of the character generator and the column counter controlling the same, in which such adding device subtracts the output values of the pulse counter from the output values of the column counter. It is further advantageous to provide a control signal from the adding device to the character generator which will prevent actuation of the character generator in the event the result of the adding device is negative.

BRIEF DESCRIPTION OF THE DRAWINGS

In the drawings wherein like reference characters indicate like or corresponding parts.

DETAILED DESCRIPTION OF THE INVENTION

Figure 1:
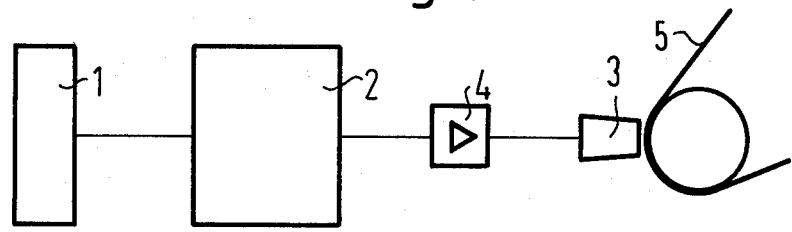
FIG. 1 schematically illustrates, in block form, the general circuit of a mosaic printing structure such as here involved.

Referring to FIG. 1, the reference numeral 1 designates a unit from which the material to be recorded is supplied, and may, for example, be in the form of a manual keyboard, a magnetic tape, a punch tape apparatus, or an external supply, with the information to be recorded being conducted to a control unit 2, which includes a character generator employing binary coding. The selection bits, which are to be supplied to a mosaic writing unit 3, are produced in the control unit 2 and conducted to the writing unit over an amplifier stage 4. In the embodiment here involved, the mosaic writing unit 3 is illustrated as provided with seven recording elements, which are disposed one above the other in a single column, with the recording elements being adapted to be selectively operative in random combinations, singly or multiply in parallel manner, with the image dots of the characters being recorded on a suitable recording medium or carrier 5. The dots thus are disposed in a straight line extending vertically with respect to the advance direction of the record carrier. The configurating of the complete characters in a coordinate aligned at right angles to the line of the seven recording element is derived from the relative motion between the mosaic write head and the recording carrier 5, in conjunction with the repeated selective actuation of the recording elements of the unit 3.

Figure 2:
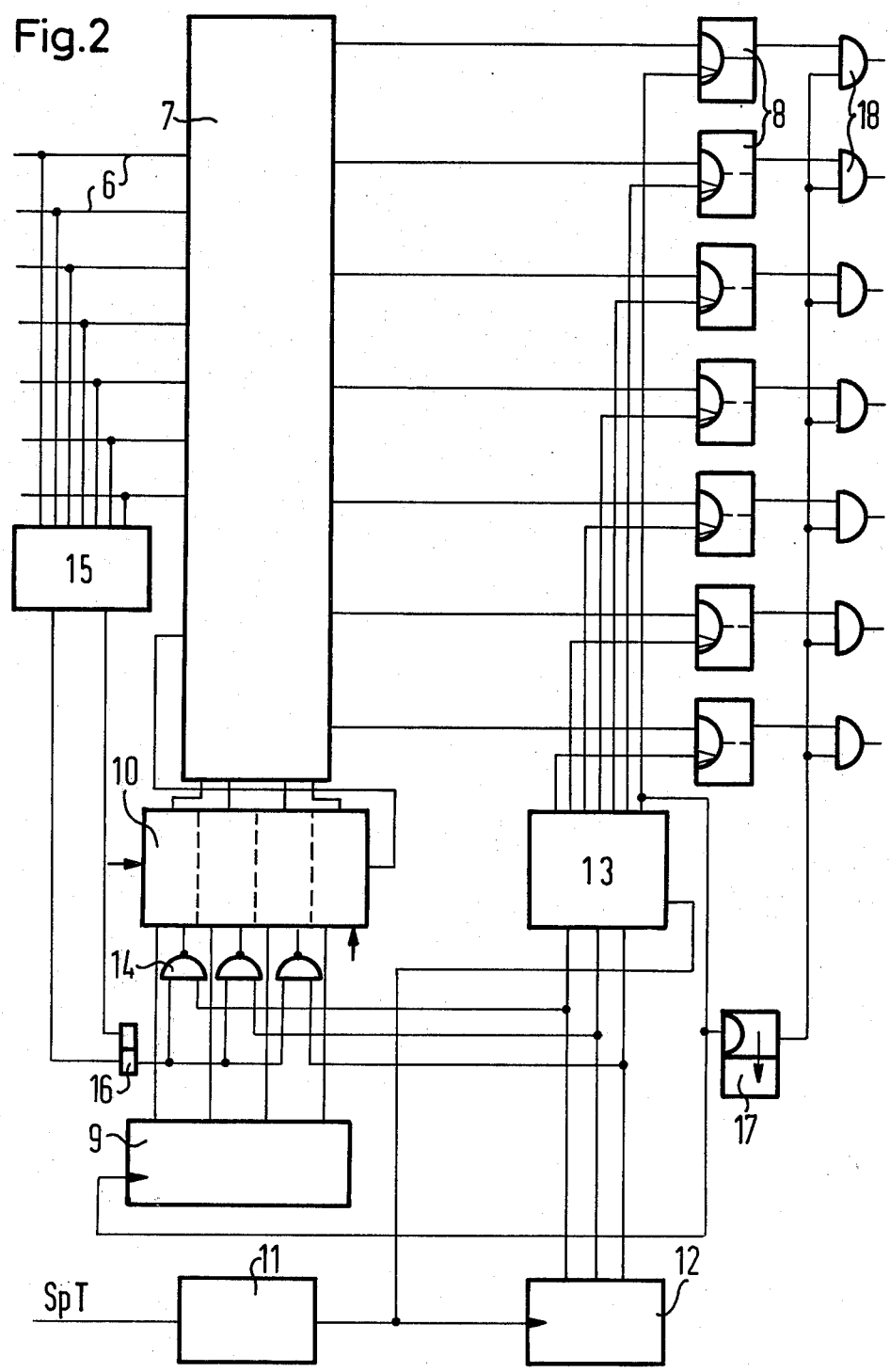
FIG. 2 schematically illustrates, in block form, the selection logic for the mosaic printing head.

The control unit 2 is illustrated in greater detail in FIG. 2, in which the character information, in the form of binary coded signals are conducted over respective input circuits 6 to the character generator 7, in which they are decoded into a form analogous to the character to be recorded in a mosaic-like raster. In accordance with the prior art, the character generator is actuated over a column-counter whereby a column decoder within the character generator supplies individual columns of selection bits which are conducted in parallel over the amplifier to the mosaic writing unit.

In the embodiment illustrated in FIG. 2, storage means are provided comprising respective pulse-controlled flipflops 8, each of which is adapted to receive binary elements of a respective row, from the character generator 7. In addition, disposed between a column counter 9 and the character generator 7 is an adding device 10. A column pulse is supplied, over the line Spt from the advance direction control for the mosaic writing unit 3, to a secondary pulse generator 11, in which such column pulse is subdivided into secondary pulses which, in turn, are supplied to a secondary pulse counter 12, operative to provide pulses for the adding device 10, as well as a binary decoder 13 which is operative to control the respective flipflops 8 of the storage stage. The pulses from the secondary pulse counter 12 are supplied to the adding device 10 over respective AND-gates 14 which are provided with inverted outputs. The second inputs of the respective stages of the adding device 10 are connected with the outputs of the column counter 9, which can be further stepped up by the pulse output of a binary coder 13. The output values of the secondary pulse counter 12 thus may be made available in inverted form or may be blocked to the adding device 10, by control of the second inputs of the AND-elements 14.

Figure 3:
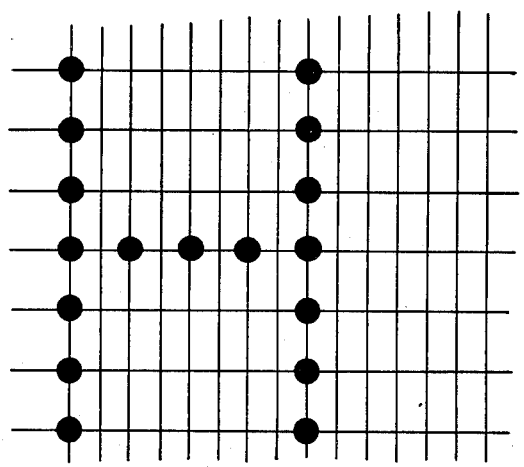
FIG. 3 represents a rastered image employing normal font configuration.

During normal writing operation, a logical O is present at the second inputs of the AND-elements 14, as a result of the condition of a bistable flipflop 16 which is controlled by the output of a decoding device 15. Thus, a logical 1 is supplied to each of the corresponding inputs of the adding device 10 and a logical 1 thus also is present at the open inputs of the adding device 10, in particular statically. As a result, the values of the column counter 9 are directly conducted to the column decoder of the character generator 7, and the secondary pulse counter 12 thus has no influence on the column selection of the character generator. Consequently, during a cycle of the secondary pulse counter 12, and thus of the binary decoder 13, character bits from the character generator 7 are merely interrogated and are entered into the storage means 8. After such a cycle, the information content stored in the storage means 8 is released to the amplifier stage 4 of the mosaic writing unit 3, by means of a release pulse applied to AND-linkage elements 18 over a monostable flipflop 17. A normal recording of the characters thus is produced in accordance with FIG. 3.

Figure 4:
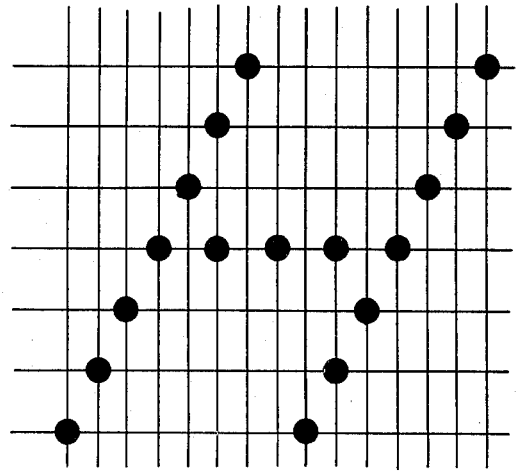
FIG. 4 represents a rastered image in slanted font configuration.

If a slanting font is to be produced, the bistable flipflop 16 is flipped into its lower position by means of an additional binary coded signal from the coding device 15, whereby a logical 1 now is present at the corresponding inputs of the AND-elements 14. The output values of the secondary pulse counter 12 are now supplied, in inverted form, over the AND-gates 14 to the corresponding inputs of the adding device 10, whereby the output values of the secondary pulse counter 12 are subtracted from the output values of the column counter 9 and conducted on to the column decoder of the character generator 7. As a result, during continuous selection of the pulse-controlled flipflops 8 of the storage means, successive columns are interrogated in the character generator and are conducted into the storage means 8. After each sequential cycle of the pulse counter 12, a release pulse is given off, as in a normal character font, over the monostable flipflop 17 to the AND-linkage elements 18. A raster image such as illustrated in FIG. 4 is thereby produced on the recording carrier during the recording operation with the respective characters appearing in a slant configuration. The carry-over output of the adding device is connected with the enabling output of the character generator 7 whereby the character generator is stopped in the event a negative difference result is computed by the adding device 10.

It will be appreciated that by appropriate selection of the frequency of the pulse generator, the slant angle of the characters may be varied. Thus by providing a variable selection of the frequencies, a selection can be provided with relatively little additional outlay.

Having thus described my invention it will be obvious that although various minor modifications might be suggested by those versed in the art, it should be understood that I wish to embody within the scope of the patent granted hereon all such modifications are reasonably, and properly come within the scope of my contribution to the art.

I claim as my invention:

1. In an arrangement for recording characters composed of matrix-like rastered character elements by means of a matrix printer controlled by binary signals supplied column-wise in parallel thereto from a character generator, to normally produce recorded characters having the portions thereof, extending transverse to the direction of the recording line, disposed at a predetermined angle relative thereto, in which such angle may be selectively changed, without change in the disposition of the matrix printer, to provide recorded characters having an appearance different from normal recorded characters, the combination of storage means to which the respective binary signals from the character generator are supplied in parallel, interrogation means connected to said character generator and to the storage means for effecting a time differential between the supply of respective character elements of a column to said storage means, and means for effecting the parallel release of the contents of the storage means to the matrix printer in synchronism with said time differential.

2. An arrangement according to claim 1, wherein said storage means comprises pulse-controlled flip-flops for the respective binary signals of a column, and said interrogation means comprises a pulse generator unit, and means operatively connecting said generator unit to the character generator for effecting a serial supply of column binary signals therefrom.

3. An arrangement according to claim 2, comprising a binary coding device operatively connecting said pulse generator unit to the flip-flops of said storage means, for controlling said flip-flops to serially effect storage of any respective column signals within each period of said time differential.

4. An arrangement according to claim 3, wherein the output of the said character generator is controlled by a column decoder, and said means connecting the pulse generator unit to the character generator comprises an adding device interposed between the column counter supplying counting values to the column decoder, said adding device being operable to subtract the output values supplied from said pulse generator unit from the output values from the column counter.

5. An arrangement according to claim 4, wherein said adding device includes means for providing a control signal to the character generator in the event the computed result of the adding device is negative, to thereupon stop the character generator.

* * * * *